Dec. 7, 1965   L. A. B. PILKINGTON   3,222,154
MANUFACTURE OF FLAT GLASS
Filed March 26, 1962
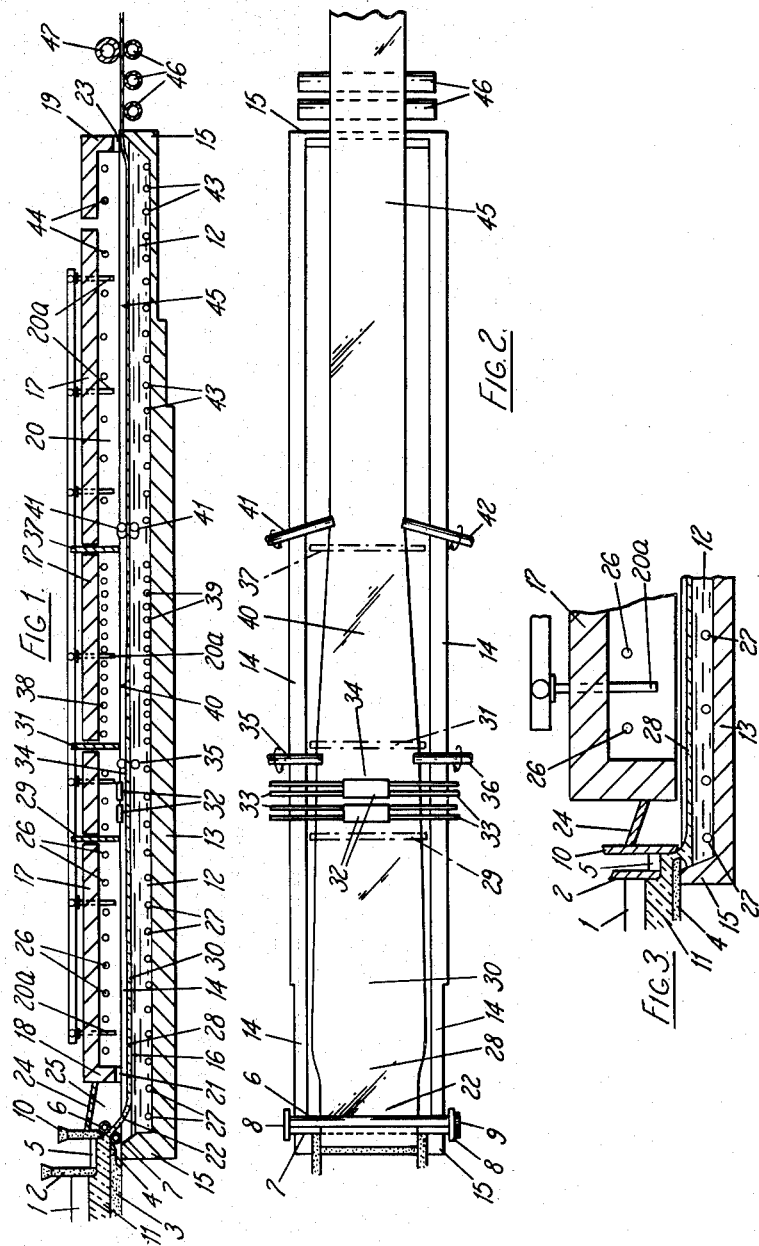

United States Patent Office 3,222,154
Patented Dec. 7, 1965

3,222,154
MANUFACTURE OF FLAT GLASS
Lionel A. B. Pilkington, Rainhill, England, assignor to Pilkington Brothers Limited, Liverpool, England, a company incorporated of Great Britain
Filed Mar. 26, 1962, Ser. No. 182,438
Claims priority, application Great Britain, Mar. 29, 1961, 11,586/61
5 Claims. (Cl. 65—91)

This invention relates to the manufacture of flat glass.

In the manner of manufacture of flat glass by the usual rolling methods imperfections on the roller surfaces are imparted to the surfaces of the glass as well as variations in thickness hereinafter sometimes referred to as "distortion" due to asymmetry in one or both of the rolls.

In the manufacture of a ribon of glass by the usual vertical drawing methods the glass produced has a lustrous "fire-finished" surface, but distortions occur in the drawn sheet as a result of local temperature differences before the sheet has set, and the process is slower than the process of producing flat glass by the usual rolling process.

The applicants herein, have proposed another method of manufacturing flat glass having a lustre of a quality such as that known as "fire-finish" and which glass is free from distortions such as occur in either the known rolling or known drawing methods of producing glass in ribbon form, which proposed method comprises the steps of delivering glass at a controlled rate to a bath of molten metal and advancing the glass along the surface of the bath under thermal conditions which assure that a layer of molten glass is established on the bath, maintaining said glass layer in molten condition until there is developed on the surface of the bath a buoyant body of molten glass of stable thickness by permitting said layer of molten glass to flow laterally unhindered to the limit of its free flow under the influence of gravity and surface tension, and thereafter continuously advancing the buoyant body in ribbon form along the bath and sufficiently cooling this ribbon as it is advanced to permit it to be taken unharmed out of the bath by mechanical means.

A main object of the present invention is to provide flexibility of manufacture of flat glass of different thicknesses, the glass having a lustre of a quality such as that known as "fire finish," and which glass is free from distortions such as occur in either the known rolling or known drawing methods of producing glass in ribbon form.

According to the invention a method of manufacturing flat glass having a predetermined thickness comprises the steps of advancing a ribbon of glass along a molten bath under thermal conditions which ensure that the ribbon of glass is sufficiently stiff to be capable of being gripped, gripping the stiff ribbon to effect a control of its velocity along the bath, the gripped ribbon thus constituting a barrier to resist transmission of longitudinal acceleration forces, progressively heating the ribbon to a transitional plastic state, imposing longitudinally directed tractive force on the plastic glass to accelerate the plastic ribbon thereby to effect a predetermined reduction in thickness of the ribbon, stabilising the ribbon of glass at the desired reduced thickness, and sufficiently cooling the stabilised ribbon to permit it to be taken unharmed from the molten bath.

The ribbon of glass which is advanced along the bath may be formed by delivering glass at a controlled rate to a molten bath and advancing the glass along the bath under thermal conditions which assure that a layer of molten glass is established on the bath, continuously advancing the layer in ribbon form along the bath, then cooling the ribbon as it is advanced to stiffen it sufficiently to be capable of being gripped.

Alternatively the ribbon of glass may be formed by delivering glass at a controlled rate to a molten bath and advancing the glass along the bath under thermal conditions which assure that a layer of molten glass is established on the bath, maintaining said glass layer in molten condition while ensuring unhindered lateral flow of its side edges to the limit of its free flow under the influence of gravity and surface tension until there is developed on the surface of the bath a buoyant body of molten glass, and thereafter continuously advancing the buoyant body in ribbon form along the bath and, cooling the ribbon as it is advanced to stiffen it sufficiently to be capable of being gripped.

Preferably in carrying out the present invention the molten bath is so constituted as to have all the characteristics as fully described in the United States of America Patent No. 2,911,759.

The apparatus for manufacturing flat glass in ribbon form having a predetermined thickness comprising in combination, a tank containing a molten bath and having an inlet for glass to the bath and an outlet from the bath, means for advancing glass in ribbon form along the bath towards said outlet, temperature regulators associated with the bath for ensuring that the ribbon of glass as it is advanced is sufficiently stiff to be capable of being gripped, gripping means arranged to grip the stiff ribbon to effect a control of its velocity along the bath, temperature regulators associated with the bath for progressively heating the stiff ribbon to a transitional plastic state as it is advanced, means for imposing longitudinally directed tractive force on the plastic glass to cause the thickness of the glass to decrease to a predetermined extent, and temperature regulators associated with the bath for stabilising and sufficiently cooling the ribbon thus formed as it is advanced to permit said ribbon to be taken undamaged through said outlet by mechanical means.

The apparatus for manufacturing flat glass in ribbon form may include means for delivering glass through said inlet and onto the bath, means for advancing the glass along the bath to said outlet, temperature regulating means associated with a first zone of the bath for causing the glass on said bath to be maintained at first as a fully molten buoyant body of glass, said delivering means including means for controlling the delivery of glass through said inlet at a rate which permits said body of molten glass to assume a stable thickness and a definite width by permitting said molten body of glass to flow laterally unhindered to the limit of its free flow under the influence of gravity and surface tension, said means for advancing the glass causing the body of stable thickness in ribbon form to advance along the bath to a second zone of the bath, which has associated temperature regulating means for causing the molten glass to be cooled as it is advanced in said second zone to stiffen it sufficiently to be capable of being gripped.

In order that the invention may be more clearly understood some preferred embodiments thereof will now be described, by way of example, with reference to the accompanying diagrammatic drawings in which:

FIGURE 1 is a sectional elevation of apparatus according to the invention comprising a tank structure confining a bath of molten metal, a roof structure over the tank structure, and apparatus for delivering a rolled ribbon of glass at a controlled rate on to the bath surface.

FIGURE 2 is a plan view of the tank structure of the apparatus of FIGURE 1, and

FIGURE 3 is a part sectional elevation corresponding to FIGURE 1 and showing a modified method of delivering glass at a controlled rate to a bath of molten metal.

In the drawings like references indicate the same or similar parts.

Referring first to FIGURES 1 and 2 of the drawings:

In the drawings a forehearth of a continuous glass melting furnace is indicated at 1, a regulating tweel at 2 and a spout at 3, the spout comprising a floor or "lip" 4 and side jambs 5, one of which only is illustrated in FIGURE 1, the side jambs and lip forming a spout of generally rectangular cross-section. In known manner, a cover may be secured over the spout.

Operatively associated with the spout are a pair of water-cooled casting rolls, the upper one of which is indicated at 6 and the lower casting roll at 7. The casting rolls are mounted in frames 8 in usual manner and are driven through toothed wheels 9 by power means, not shown.

A gate 10 is adjustably suspended in known manner in a vertical plane in contiguity with the upper casting roll 6. The gate 10 shields the upper roll 6 from the heat radiated from the molten glass 11 flowing from the forehearth 1 over the lip 4 of the spout 3 to the pass between the casting rolls 6 and 7.

The upper casting roll 6 is disposed slightly in advance of the lower casting roll 7 so that the molten glass 11 flows from the lip 4 on to the upper part of the roll 7 which thus presents to the glass a downwardly and forwardly directed arcuate casting bed moving in the same direction as the flow of the glass 11 along the spout. Thus the molten glass 11 on leaving the spout and arriving on this casting bed is constrained to flow forwardly thereby preventing backward flow of molten glass under the spout 3.

The ribbon-forming means comprising casting rolls 6 and 7, just described, is disposed over one end of a tank structure which contains a bath 12 of molten metal, for example, molten tin. The tank comprises a floor 13, side walls 14 and end walls 15. The side walls 14 and end walls 15 are integral with each other and with the floor 13. The level of the surface of the bath 12 of molten metal is indicated at 16 in FIGURE 1.

The tank structure supports a roof structure bridging the bath 12 and including a roof 17, end walls 18 and 19 and side walls 20 so that the roof structure provides a tunnel over the bath 12 and defines a head space over the bath into which head space non-oxidising gas is fed through ducts 20a to prevent the formation in the metal bath of contaminants for the glass.

The end wall 18 at the inlet end of the tank extends downwardly into the tank structure and defines an inlet 21 through which a formed ribbon of glass 22 is delivered by the casting rolls 6 and 7 to the bath. The end wall 19 of the roof structure at the outlet end of the tank defines with the end wall 15 of the tank an outlet 23 through which a cooled ribbon of glass of predetermined thickness is taken undamaged from the molten bath 12 by mechanical means.

At the inlet end of the tank an extension 24 of the roof 17 is provided and forms with the gate 10 a chamber enclosing the casting rolls 6 and 7, this chamber further comprising side walls 25 carried by the side walls 14 of the tank.

The formed ribbon of glass 22 is delivered at a controlled rate through the inlet 21 to the bath and is advanced along the surface of the bath into a first zone of the bath in which the thermal conditions maintained by temperature regulating means shown as heaters 26 mounted in the roof 17, and heaters 27 immersed in the bath, assure that the ribbon 22 is melted and a layer 28 of molten glass is thereby established on the bath.

The first zone is enclosed in a chamber defined by the input end wall 18 of the roof structure, a refractory partition 29 extending across the tank structure and downwardly from the roof 17, the roof 17 and the side walls 20. As the glass passes through this first zone it changes into a molten condition at such a temperature, for example about 1,000° C. for soda-lime glass, that it flows laterally unhindered to the limit of its free flow under the influence of gravity and surface tension, until there is developed on the surface of the bath 12 a buoyant body 30 of fully molten glass of stable equilibrium thickness and of a definite width which is greater than the width of the ribbon to be taken from the bath, the stable thickness being achieved when the lateral flow ceases, i.e. when a state of equilibrium has been established, or substantially so, between the forces of surface tension of the molten glass and the molten metal and the forces of gravity.

The configuration of the tank structure at the level 16 of the bath 12 and the rate of delivery of glass to the bath in the form of the rolled ribbon 22 are related so that the distance between the side walls 14 of the tank is greater than the width of the buoyant body 30, which buoyant body of molten glass is therefore permitted to develop without hindrance from the side walls 14 of the tank, as shown in FIGURE 2. The length of the first zone is sufficient to permit the molten layer formed from the ribbon 22 to change into the buoyant body 30 of molten glass of equilibrium thickness.

From the first zone the buoyant body 30 of molten glass is continuously advanced along the bath to a second zone enclosed in a chamber defined by the partition 29, a second partition 31 which also extends across the tank structure and downwardly from the roof 17, the roof 17 and the side walls 20. Water cooled boxes 32 are mounted between the side walls 14 of the tank structure and over the path of the ribbon. Each of the water cooled boxes 32 is of a rectangular section and has a flat lower surface which absorbs heat radiated from the ribbon as it is advanced under the boxes, so that the ribbon is cooled as it is advanced under the boxes 32 to stiffen it sufficiently to be capable of being gripped. Water is supplied to and exhausted from the boxes 32 by pipes 33 which also support the boxes 32 on the side walls 14 over the ribbon.

The cooled stiffened ribbon 34 which emerges from under the boxes 32 is gripped by two pairs of edge rolls 35 and 36 respectively mounted at oppositely disposed locations across the tank. The lower roll of each pair is immersed in the bath 12 and the upper roll of each pair is arranged above the surface of the bath so that the edges of the stiffened ribbon are gripped between the rolls as indicated in FIGURE 1. The axes of the rolls 35 and 36 are at right angles to the direction of the travel of the ribbon. Driving means connected to the rolls 35 and 36 is operable to control their rotational speeds, the rolls rotating in the direction of the arrows on the upper rolls in FIGURE 2, thereby to effect a control of the velocity of the stiffened ribbon along the bath.

The glass as it passes under the boxes 32 is stiffened over the whole width of the ribbon so that the stiffened ribbon which is gripped by the pairs of edge rolls 35 and 36 constitutes a barrier to resist transmission of longitudinal acceleration forces to the buoyant body 30 of molten glass.

The speed at which the rolls 35 and 36 are driven may be such that the velocity of the stiffened ribbon 34 along the bath is the same as the velocity of advance of the buoyant body of glass. Alternatively, the speed of rotation of the rolls 35 and 36 may be such that the velocity of the stiffened ribbon 34 along the bath is slightly greater than the velocity of advance of the buoyant body 30 so that there will be a slight tapering of the buoyant body 30 as it approaches the first partition 29, as exemplified in FIGURE 2.

This slight tapering is caused by the acceleration of the molten glass as it approaches the partition 29, and because the buoyant body 30 necessarily maintains the stable equilibrium thickness there is a slight progressive decrease in width of the buoyant body. The stiffened ribbon passes under the partition 31 into a third zone enclosed in a chamber defined by the partition 31, a third partition 37 extending across the tank and downwardly from the roof 17, the roof 17 and the side walls 20. In the head space of the third zone there is a concentration of heaters 38 and there is a corresponding concentration of heaters 39 immersed in the molten bath 12 between the partitions 31 and 37.

The stiffened ribbon 34 is at a temperature of about 700° C. when it passed under the partition 31 and the temperature gradient in the third zone is such that the temperature of the ribbon is raised during its passage through the third zone to about 850° C., when treating soda-lime glass. Thus as the glass passes through the third zone it is progressively reheated to a transitional plastic state, although it is not made so hot that forces of surface tension and gravity play any substantial part in determining the dimensions of the plastic ribbon 40.

The plastic glass 40 in this third zone is subjected to controlled attenuation to reduce its thickness by a predetermined amount in the manner hereinafter described, by imposing a longitudinally directed tractive force on the plastic glass, and at the temperature of 850° C. of the glass emerging under the partition 37, the glass is still in a plastic state and can therefore still be attenuated.

The plastic glass 40 passes from the third zone into a fourth zone enclosed in a chamber defined by the partition 37, the end wall 19, the roof 17 and the side walls 20, and the width of the ribbon of plastic glass is controlled by the application of tensile forces developed transversely of the ribbon in the plastic state at oppositely disposed locations on the ribbon by two pairs of auxiliary edge rolls 41 and 42 which are respectively mounted at oppositely disposed locations in the fourth zone just downstream of the partition 37, and which grip the edges of the plastic ribbon emerging under the partition 37 to control and maintain the width of the plastic ribbon as its thickness is further decreased.

The axes of the edge rolls 41 and 42 are inclined to the direction of travel of the ribbon and the rolls rotate in the direction of the arrows indicated in FIGURE 2. Thermal regulators 43 immersed in the metal bath in the fourth zone and thermal regulators 44 in the head space over the bath between the partition 37 and the end wall 19 regulate the temperature of the fourth zone of the bath by creating a temperature gradient down to about 650° C. at the outlet 23 so that the plastic ribbon leaving the edge rolls 41 and 42 is stabilised, that is it has become sufficiently stiff to hold its shape so that its width does not diminish any further, and the stabilised ribbon is then sufficiently cooled to permit the cooled ribbon 45 to be taken unharmed from the bath through the outlet 23 by lehr rollers 46 disposed at the outlet end of the tank slightly above the level of the bottom of the outlet 23.

Superimposed driven rollers 47 co-operate with the rollers 46 at the entry to a lehr (not shown) to apply a tractive effort to the ribbon of glass 45, which tractive effort is transmitted by the stabilised and cooled ribbon 45 back to the plastic glass 40 in the third zone of the bath.

This longitudinally directed tractive effort from the lehr is sufficient to maintain the ribbon moving along the bath surface and also to apply the tractive force required to accelerate the plastic glass 40 so as to cause the desired reduction in thickness of the plastic glass. The tractive force is partly dissipated in the attenuation of the plastic glass, and the stiffened ribbon 34 and gripping rolls 35 and 36 form a barrier which resists the transmission to the buoyant body 30 of longitudinal acceleration forces applied from the lehr or from the edge rolls 41 and 42, which rolls may be free-running or may be driven in a direction to assist in the advancement of the ribbon, for example they may be driven at a higher speed than the rolls 35 and 36 in order to assist the attenuation of the plastic glass, that is, the plastic glass 40 is advanced through the oppositely disposed locations of the rolls 41 and 42 at a velocity which is greater than the velocity of advance of the stiffened ribbon 34.

It will be understood that the auxiliary edge rolls 41 and 42 may be supplemented by further pairs of auxiliary edge rolls so that there are successive pairs of edge rolls which may be driven at progressively increasing velocities to accelerate the plastic glass as it is advanced.

The buoyant body 30 of molten glass has a uniform equilibrium thickness and flat parallel surfaces and the pristine flatness of this buoyant body of glass is maintained in the stiffened ribbon 34 and in the plastic glass 40 as it is attenuated so that the ribbon 45 discharged from the bath is of uniform thickness, is free from distortion, and has flat parallel surfaces and a "fire finish" lustre.

A ribbon of glass may be attenuated according to the invention, without being melted on the bath to form a layer of molten glass which is subsequently stiffened and gripped. Accordingly the ribbon of glass delivered on to the bath may be sufficiently stiff to be advanced along the bath and to be gripped. The ribbon delivered on to the bath may be at or about the same temperature as the bath so that there is no substantial change in the temperature of the ribbon before it is gripped, or if the ribbon delivered to the bath is at a temperature above that of the bath then the ribbon is gradually cooled on the bath as it is advanced towards the gripping means, and the provision of cooling means such as the water cooled boxes 32 may not be necessary.

Instead of regulating the delivery of glass to the bath by feeding a ribbon of glass of predetermined dimensions to the bath at a controlled rate, glass in molten form may be supplied direct to the bath from the spout 4 of the forehearth 1. Such a construction is illustrated in FIGURE 3 and the gate 10 in this construction controls the rate at which molten glass is delivered to the bath 12 to form the layer 28 of molten glass on the bath.

The method of controlled attenuation according to the invention may also be applied to a ribbon of glass which is produced from a buoyant layer of molten glass established on the molten bath and confined between and engaging mobile wettable or non-wettable surfaces extending longitudinally of the bath, as described in co-pending application No. 182,282, filed March 26, 1962. As the buoyant layer is advanced along the bath the mobile surfaces are simultaneously advanced to maintain uniform velocity across the whole width of the layer, and the layer is cooled as it is advanced to stiffen it sufficiently to be capable of being gripped. In the manner described herein the stiffened ribbon produced from the buoyant layer is gripped and is progressively reheated to a transitional plastic state and is then subjected to controlled attenuation.

Alternatively a buoyant layer of molten glass is established on the bath in the manner described in co-pending application No. 182,479, filed March 26, 1962 which layer is confined between non-wettable surfaces, and is advanced along the bath between said surfaces. The layer is cooled as it is advanced until the glass is stiffened sufficiently to be capable of being gripped, and the ribbon so produced is gripped, is progressively reheated to a transitional plastic state and is then subjected to controlled attenuation.

By the herein described method of controlled attenuation of a ribbon of equilibrium glass, production of flat glass of uniform thickness is facilitated having a lustre of a quality such as that known as "fire-finish" and freedom from distortions such as occur in the known rolling or drawing methods.

The herein described method further provides flexibility of manufacture because the barrier to the transmission of longitudinal acceleration forces, which barrier is formed by gripping the stiffened ribbon before the glass is progressively reheated to a plastic state, enables flat glass of different thicknesses to be manufactured, the thickness being regulated by varying the longitudinally directed tractive force imposed on the plastic glass. The glass has the pristine flatness of the buoyant body of molten glass of stable thickness which is formed on the bath, for example glass of 3 mm. thickness, having a "fire finish" lustre and freedom from distortion, can be manufactured.

I claim:

1. A method of manufacturing flat glass having a predetermined thickness, comprising the steps of advancing a ribbon of glass forwardly along a bath of molten metal, thermally conditioning the glass as it is advanced to ensure that a part of the ribbon of glass passing along a zone of said bath is stiffened sufficiently at said zone to be capable of being gripped, gripping the stiffened part of the ribbon at said zone in order to control the velocity of that part of the ribbon along the bath at said zone, continuing the advance of the stiffened part of the ribbon along the bath beyond said zone at the controlled velocity, progressively heating the stiffened part of the ribbon forwardly beyond said zone to a transitional plastic state as it is further advanced while imposing longitudinally directed tractive force on the glass in that transitional plastic state to accelerate the plastic glass, thereby effecting a predetermined reduction in thickness of the ribbon, the gripped stiffened part of the ribbon advancing at said zone at a controlled velocity constituting a barrier to resist transmission beyond the stiffened part of the ribbon of any longitudinally directed tractive force transmitted through the plastic glass to the stiffened part of the ribbon, then stabilising the ribbon of glass at the desired reduced thickness, and sufficiently cooling the stabilised ribbon to permit it to be taken unharmed from the bath.

2. A method of manufacturing flat glass having a predetermined thickness which comprises the steps of delivering glass at a controlled rate to a bath of molten metal and advancing the glass forwardly along the bath under thermal conditions which assure that a layer of molten glass is established on the bath, continuously advancing the layer forwardly in ribbon form along the bath, cooling the ribbon as it is advanced along a zone of said bath to stiffen it sufficiently to be capable of being gripped, gripping the stiffened part of the ribbon at said zone to effect a control of the velocity of that part of the ribbon along the bath of said zone, continuing the advance of the stiffened part of the ribbon along the bath at the controlled velocity, progressively reheating the stiffened part of the ribbon forwardly beyond said zone to a transitional plastic state as it is further advanced while imposing longitudinally directed tractive force on the glass in that plastic state to accelerate the plastic glass thereby effecting a predetermined reduction in thickness of the ribbon while maintaining the pristine flatness of the glass, the gripped stiffened part of the ribbon at said zone constituting a barrier to resist transmission to the layer of molten glass of any longitudinally directed tractive force transmitted through the plastic glass to the stiffened part of the ribbon, then stabilising the ribbon of glass at the desired reduced thickness, and sufficiently cooling the stabilised ribbon to permit it to be taken unharmed from the molten bath.

3. A method of manufacturing flat glass having a predetermined thickness which comprises the steps of delivering glass at a controlled rate to a bath of molten metal and advancing the glass forwardly along the bath under thermal conditions which assure that a layer of molten glass is established on the bath, maintaining said glass layer in molten condition while ensuring unhindered lateral flow of its side edges to the limit of its free flow under the influence of gravity and surface tension until there is developed on the surface of the bath a buoyant body of molten glass of stable thickness, and thereafter continuously advancing the buoyant body forwardly in ribbon form along the bath, cooling the ribbon as it is advanced along a zone of said bath to stiffen it sufficiently at said zone to be capable of being gripped, gripping the stiffened ribbon at said zone to effect a control of its velocity along the bath at said zone, the gripped stiffened ribbon thus constituting a barrier to resist transmission of longitudinal acceleration forces to the buoyant body of molten glass, progressively reheating the stiffened ribbon forwardly beyond said zone to a transitional plastic state, imposing longitudinally directed tractive force on the plastic glass to accelerate the plastic ribbon thereby to effect a predetermined reduction in thickness while maintaining the pristine flatness of the glass, stabilising the ribbon of glass at the desired reduced thickness, and sufficiently cooling the stabilised ribbon to permit it to be taken unharmed from the molten bath.

4. Apparatus for manufacturing flat glass in ribbon form having a predetermined thickness comprising in combination, a tank containing a bath of molten metal and having an inlet for glass to the bath and an outlet from the bath, means for advancing glass in ribbon form along the bath towards said outlet, temperature regulators mounted in the tank at a zone along said bath for ensuring that the ribbon of glass as it is advanced along said zone in the bath is sufficiently stiff to be capable of being gripped, gripping means mounted in the tank in the region of the surface level of the bath and at said zone so as to grip the stiff part of the ribbon at said zone in order to control the velocity of that ribbon part along said zone, temperature regulators mounted in the tank downstream of said gripping means in the direction of advance of the ribbon for progressively heating the stiffened part of the ribbon to a transitional plastic state as it is advanced, means for imposing longitudinally directed tractive force on the plastic glass to cause the thickness of the glass to decrease to a predetermined extent, and temperature regulators mounted in the tank and associated with the outlet end of the bath for stabilising and sufficiently cooling the ribbon thus formed as it is advanced to permit said ribbon to be taken undamaged through said outlet by mechanical means.

5. Apparatus for manufacturing flat glass in ribbon form having a predetermined thickness comprising, in combination, a tank containing a bath of molten metal and having an inlet to and an outlet from the bath, means for delivering glass through said inlet and onto the bath, means for advancing the glass along the bath towards said outlet, temperature regulating means associated with a first zone of the bath for causing the glass on said bath to be maintained at first as a fully molten buoyant body of glass along said first zone, said delivering means including means for controlling the delivery of glass through said inlet at a rate which permits said body of molten glass to assume a stable thickness and a definite width by permitting said molten body of glass to flow laterally unhindered to the limit of its free flow under the influence of gravity and surface tension, said means for advancing the glass causing the body of stable thickness in ribbon form to advance along the bath to a second zone of the bath extending down the bath from the downstream limit of said first zone, temperature regulating means associated with said second zone of the bath for causing the molten glass to be cooled as it is advanced through said second zone to stiffen it sufficiently to be capable of being gripped, gripping means mounted in the tank in the region of the surface level of the bath at the downstream end of said second zone so as to grip the stiffened part of the ribbon in order to control the velocity of that ribbon part along the bath, temperature regulating means associated with a third zone of the bath extending down the bath from the downstream limit of the second zone to reheat the stiffened part of the ribbon to a transitional plastic state as it is advanced through said third zone, means for imposing longitudinally directed tractive force on the plastic glass as it passes through said third zone to cause the thickness of the glass to decrease to a predetermined extent while maintaining the pristine flatness achieved in said buoyant body of glass, and temperature regulating means associated with a fourth zone of the bath extending from said third zone to the outlet end of the bath for stabilising and sufficiently cooling the ribbon thus formed as it is advanced to permit said ribbon to be taken undamaged through said outlet by mechanical means.

References Cited by the Examiner

UNITED STATES PATENTS

| | | | |
|---|---|---|---|
| 710,357 | 9/1902 | Heal | 65—258 |
| 1,489,852 | 4/1924 | Rowley | 65—91 |
| 1,564,240 | 12/1925 | Hitchcock | 65—101 |
| 2,618,012 | 11/1952 | Milne | 65—200 X |
| 2,668,988 | 2/1954 | Bailey et al. | |

DONALL H. SYLVESTER, *Primary Examiner.*

UNITED STATES PATENT OFFICE
CERTIFICATE OF CORRECTION

Patent No. 3,222,154                    December 7, 1965

Lionel A. B. Pilkington

It is hereby certified that error appears in the above numbered patent requiring correction and that the said Letters Patent should read as corrected below.

Column 1, line 18, for "ribon" read -- ribbon --; column 2, line 14, for "bath and," read -- bath, and --; --; line 21, after "The" insert -- invention also comprehends --; column 6, line 73, after "bath," insert -- and --.

Signed and sealed this 20th day of September 1966.

(SEAL)
Attest:

ERNEST W. SWIDER                    EDWARD J. BRENNER
Attesting Officer                       Commissioner of Patents